US012742491B2

(12) United States Patent
Verrips et al.

(10) Patent No.: US 12,742,491 B2
(45) Date of Patent: Sep. 22, 2026

(54) ELECTRIC AXLE DRIVE FOR A VEHICLE WHEEL AXLE

(71) Applicant: DAF Trucks N.V., Eindhoven (NL)

(72) Inventors: Michel Verrips, Leerbroek (NL); Jordan Michael Houser, Fort Worth, TX (US); Nikhil Naresh Gadve, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 19/211,381

(22) Filed: May 19, 2025

(65) Prior Publication Data

US 2026/0016073 A1 Jan. 15, 2026

(30) Foreign Application Priority Data

Jul. 11, 2024 (NL) ..................................... 2038203

(51) Int. Cl.
*B60K 1/00* (2006.01)
*B60B 35/12* (2006.01)
(Continued)

(52) U.S. Cl.
CPC ......... *F16H 37/082* (2013.01); *B60B 35/125* (2013.01); *B60K 1/00* (2013.01);
(Continued)

(58) Field of Classification Search
CPC ..... F16H 2200/2007; F16H 2200/2064; F16H 2200/2094; F16H 2200/0021; F16H 3/66;
(Continued)

(56) References Cited

U.S. PATENT DOCUMENTS 2,848,908 A 8/1958 Hollis
3,602,345 A * 8/1971 Rattenberg .............. F16D 11/10 192/69.82

(Continued)

FOREIGN PATENT DOCUMENTS

DE 102015218820 A1 3/2017
DE 102020000195 A1 10/2020

(Continued)

OTHER PUBLICATIONS

Dutch Search Report and Written Opinion—App No. 2038203—mailing date Jan. 16, 2025.

*Primary Examiner* — Ernesto A Suarez
*Assistant Examiner* — Lillian T Nguyen
(74) *Attorney, Agent, or Firm* — Banner & Witcoff, Ltd.

(57) ABSTRACT

An electric axle drive comprises a gear assembly having a first planetary gear set and a second planetary gear set. The gear assembly further comprises a spline ring that is provided with internal splines along an axial direction of the spline ring and that is slidably provided over ring wheel of the first planetary gear set having mating splines on its outer surface. The spline ring comprises an external groove along its circumference, for receiving a first shift actuator element to shift the spline ring in axial directions over the ring wheel. The spline ring further comprises a first interlock profile on one axial side, that locks the spline ring to a corresponding profile provided onto the stationary housing. The spline ring comprises a second interlock profile on an another axial side, that locks the spline ring, when slid by the actuator element to a corresponding profile provided on the carrier.

15 Claims, 10 Drawing Sheets

(51) Int. Cl.

| | |
|---|---|
| ***B60K 17/02*** | (2006.01) |
| ***B60K 17/08*** | (2006.01) |
| ***B60K 17/16*** | (2006.01) |
| ***F16H 3/58*** | (2006.01) |
| ***F16H 37/08*** | (2006.01) |
| *B60K 1/02* | (2006.01) |

(52) U.S. Cl.
CPC .............. *B60K 17/02* (2013.01); *B60K 17/08* (2013.01); *B60K 17/165* (2013.01); *B60K 2001/001* (2013.01); *B60K 1/02* (2013.01); *F16H 2200/0021* (2013.01); *F16H 2200/0043* (2013.01); *F16H 2200/2007* (2013.01); *F16H 2200/2094* (2013.01)

(58) Field of Classification Search
CPC ... B60K 1/00–02; B60K 17/02–17/165; B60K 6/36–547
See application file for complete search history.

(56) References Cited

U.S. PATENT DOCUMENTS 6,083,135 A * 7/2000 Baldwin .................. F16H 3/66 475/276
6,375,592 B1 * 4/2002 Takahashi ........... F16H 61/0295 475/262
7,131,924 B2 * 11/2006 Gumpoltsberger ....... F16H 3/66 475/275
7,621,387 B2 * 11/2009 Lin ......................... F16H 63/48 74/411.5
11,331,992 B2 5/2022 Krajewski et al.
2012/0165156 A1 * 6/2012 Oguri ...................... F16H 3/666 477/111
2016/0046180 A1 * 2/2016 Hwang .................. B60K 6/365 903/910
2018/0072149 A1 * 3/2018 Burgman ............... B60K 6/365
2019/0299766 A1 * 10/2019 Takada .................. B60W 20/40
2019/0331200 A1 10/2019 Barendrecht
2020/0063829 A1 * 2/2020 Jang ........................ F16H 3/006
2020/0063830 A1 * 2/2020 Jang .................... F16H 37/0833
2021/0008969 A1 1/2021 Chopra et al.
2021/0237566 A1 8/2021 Chopra et al.
2022/0297520 A1 9/2022 Mepham et al.
2022/0373064 A1 11/2022 Barillot et al.
2022/0396136 A1 12/2022 Barillot et al.
2023/0142860 A1 5/2023 Bergström
2023/0220908 A1 7/2023 Hedman

FOREIGN PATENT DOCUMENTS

| | | | |
|---|---|---|---|
| DE | 102019206954 | A1 | 11/2020 |
| DE | 102019206967 | A1 | 11/2020 |
| DE | 202020105065 | U1 | 12/2020 |
| DE | 102020101667 | A1 | 7/2021 |
| DE | 102020003840 | A1 | 12/2021 |
| DE | 102022108340 | A1 | 5/2022 |
| DE | 102022114572 | A1 | 12/2023 |
| EP | 3789223 | A1 | 3/2021 |
| EP | 3854616 | A1 | 7/2021 |
| EP | 3855048 | A1 | 7/2021 |
| EP | 4101671 | A1 | 12/2022 |
| EP | 4173858 | A1 | 5/2023 |
| EP | 4238797 | A1 | 9/2023 |
| WO | 2021063235 | A1 | 4/2021 |
| WO | 202114860 | A1 | 7/2021 |
| WO | 202180499 | A1 | 9/2021 |
| WO | 22258143 | A1 | 12/2022 |
| WO | 23073632 | A1 | 5/2023 |

* cited by examiner

| | 0 | 1 | 2 |
|---|---|---|---|
| S1 | Ring | Housing | Carrier |
| S2 | Sun | Housing | Carrier |
| S3 | Sun | Housing | Carrier |
| S4 | Ring | Housing | Carrier |

615
612
613
6021
6123
611

61
6021
62

615
612
613
6123
613
6021
611
6021

61
600
62

80

86
200
100

80

300
86
100
100′
80′
87′

ELECTRIC AXLE DRIVE FOR A VEHICLE WHEEL AXLE

CROSS-REFERENCE TO RELATED APPLICATIONS

This application claims priority under 35 U.S.C. § 119 to Application NL 2038203, filed Jul. 11, 2024, which is hereby incorporated by reference in its entirety.

FIELD OF THE INVENTION

The present invention relates to electric axle drives for vehicle wheel axles, and more particularly to a compact and efficient gear assembly that limits the axial extent along the wheel axle.

BACKGROUND ART

In the field of electric vehicle propulsion, efficient axle drives have become the center of interest. Axle drives of the present kind are drives that directly drive a vehicle axle having at least two propulsion wheels on the ground. Such vehicle axles are provided with a differential gear wheel that is coaxial to the wheel axle and to which the drive can connect in order to drive the differential gear wheel, which accordingly distributes the drive power over the wheels. In order to have more range in performance such axle drives comprise at least one electric motor and a gear assembly for converting the work range of the electric motor to a suitable dynamic range for propulsion.

A gear assembly comprises a gear assembly input shaft coupled to the rotor and a gear assembly output shaft to be coupled to the differential gear wheel. The input shaft receives rotational energy from the electric motor's rotor, and the output shaft transmits this energy to the differential gear wheel, to enhance a seamless transfer of power from the motor to the wheels, optimizing the vehicle's propulsion efficiency. There may one or more intermediate shafts to produce the required torques at the output shaft.

To increase drivability characteristics and energy efficiency the gear assembly is preferably able to shift to several gear ratios to expand the dynamic range, e.g. one range with high torque-low velocity and one range with lower torque at higher velocities. One such electric drive is known from U.S. Pat. No. 11,331,992. The gear assembly comprises two parallel axles, one coupled to an electric motor and the other coupled to a differential wheel. Each axle is provided with a planetary gear set for reducing the rotational speed, one comprising an input shaft coupled to the electric motor and one comprising an output shaft coupled to the differential wheel. One of the planetary gear sets is shift able. However such a shift in gears has disadvantages since it needs to provide axial room for axially shifting one of the gear wheels in the planetary gear set, which in addition provides challenges bearing the gear wheels.

The inventive axle drive aims to achieve a compact design by integrating the described gear assembly, which significantly reduces the axial length while maintaining robust power transmission capabilities. The axial length is an important dimension, since the motor and gear design are provided at a central location on or near the wheel axis, where in the axial extent there is limited room between the propulsion wheels on the road and other important infrastructure, such as brakes, suspension and storage capability for electric power (batteries, hydrogen tanks). A design is needed that not only facilitates easier vehicle integration but also enhances overall efficiency and performance, addressing the long-standing problems associated with traditional axle drive systems.

A challenge remains to develop an axle drive that minimizes the axial length of the gear assembly that is shiftable without sacrificing efficiency or mechanical integrity.

The present invention provides an electric axle drive that overcomes the limitations of conventional designs by offering a gear assembly with a limited axial extent along the wheel axle. This is achieved through an innovative arrangement of planetary gears and pinions that effectively shorten the overall length of the gear assembly.

SUMMARY

It is therefore an object of the present invention to provide an electric axle drive for a vehicle wheel axle with a differential gear wheel coaxial to the wheel axle. The axle drive comprises at least one electric motor and a gear assembly, said electric motor comprising a rotor and a stationary housing; and the gear assembly comprising a gear assembly input shaft coupled to the rotor and a gear assembly output shaft to be coupled to the differential gear wheel. The gear assembly comprises a first planetary gear set comprising a first sun wheel, a first carrier of planetary wheels and a first ring wheel; a first pinion driven by the first carrier; and a second planetary gear set comprising a second sun wheel, a second carrier of planetary wheels and a second ring wheel. The second ring wheel is driven by the first pinion; said gear assembly output shaft is driven by the second carrier; and said first sun wheel is driven by the gear assembly input shaft.

The gear assembly further comprises a spline ring that is provided with internal splines along an axial direction of the spline ring and that is slidably provided over the first ring wheel having mating splines on its outer surface. The spline ring comprises an external groove along its circumference, for receiving a first shift actuator element to shift the spline ring in axial directions over the ring wheel. The spline ring further comprises a first interlock profile on one axial side, that locks the spline ring, when slid by the actuator element in one axial direction, to a corresponding profile provided onto the stationary housing; and wherein said spline ring comprises a second interlock profile on an another axial side, that locks the spline ring, when slid by the actuator element in another axial direction, to a corresponding profile provided on the carrier.

By the spline ring, axial movement of the ring wheel can be prevented when the ring wheel is coupled or decoupled which provides an alternative that reduces the extent of the gear assembly.

BRIEF DESCRIPTION OF THE DRAWINGS

The Invention Will be Further Elucidated in the Figures.

DETAILED DESCRIPTION

Figure 1:
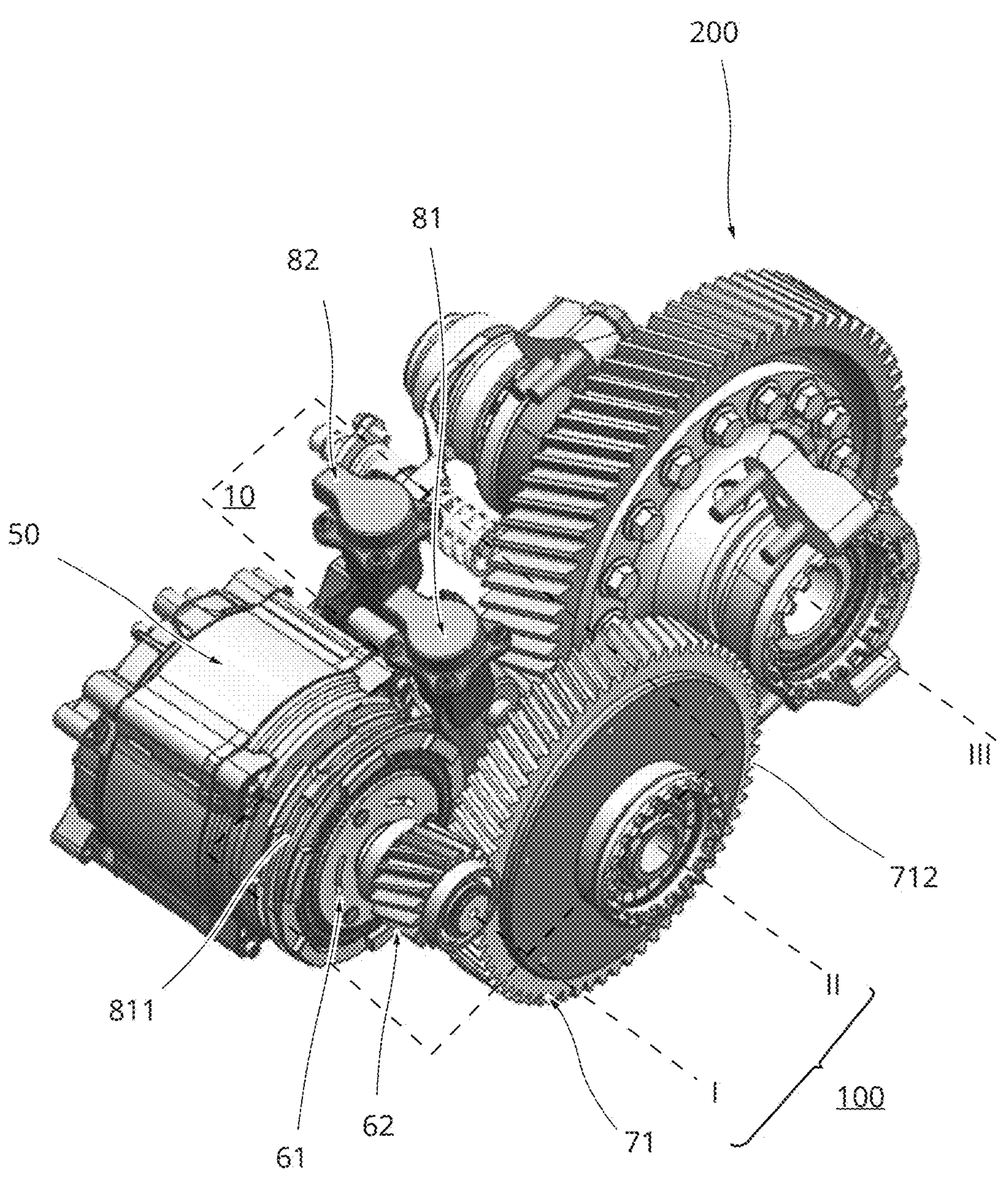
FIG. 1 illustrates a first perspective view of the electric drive coupled to a differential wheel (in isolated view) of a vehicle axle.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

It will be clear to the skilled person that the invention is not limited to any specific embodiment herein described and that combinations or modifications are possible, in as far as these can be considered within the scope of the appended claims. Also kinematic inversions are considered inherent to the invention disclosed herein. In the claims, any reference signs shall not be construed as limiting the claim.

The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope.

In the following, an 'axle' may comprise a number of coaxial parts, including bearings, shafts and gear wheel for providing a rotary transmission of movement in a single axis. A shaft may be part of an axle and is generally an integral part, but may be composite, in particular comprise fixed composite parts that may be coupled or rotatably coupled. Parts that are mounted are usually rotatably coupled. A wheel may be part of a gear set, including a planetary gear set. Wheels may have toothing, in particular spline, spur or helical toothing, for transferring rotary movement within a coaxial gear set or to corresponding axle arrangements or parts. Torque flow may be provided from one axle to another axle, in particular, from an input shaft of a primary axle to an output shaft of a secondary axle or further axle.

According to the invention the gear assembly comprises a first planetary gear set comprising a first sun wheel, a first carrier of planetary wheels, and a first ring wheel. An input shaft directly drives the first sun wheel, initiating the gear reduction process. The first planetary gear set modifies the speed and torque of the input power from the motor. The sun wheel drives the planetary wheels, which in turn interact with the ring wheel. This arrangement provides a compact and efficient means of altering gear ratios, enhancing the adaptability of the drive system to different driving conditions. The first carrier, driven by the planetary wheels, transmits motion to the first pinion, providing precise and controlled transfer of rotational energy, contributing to the smooth operation of the gear assembly. The second planetary gear set likewise comprises a second sun wheel, a second carrier of planetary wheels, and a second ring wheel. This additional gear stage allows for further adjustments in speed and torque, optimizing the performance and efficiency of the axle drive. The first pinion, driven by the first carrier, preferably directly drives the second ring wheel, which reduces complexity and potential points of failure, improves efficiency and enhances the reliability and durability of the gear assembly. The second carrier transmits the final modified rotational energy to the output shaft, providing efficient delivery of power to the differential gear wheel, enabling smooth and effective vehicle propulsion.

While the drive can be coupled to a differential gear wheel in many advantageous embodiments, a particular advantageous embodiment is an electric axle drive for a vehicle wheel axle with a differential gear wheel coaxial to the wheel axle with a second pinion provided on the output shaft driving the differential gear wheel. This particular embodiment allows a relative compact form, where the differential wheel and the second planetary gear set may partly overlap by having the differential wheel side wards of the ring wheel.

To further enhance the compactness, preferably the rotor of the electric motor is parallel to the wheel axle, in particular coaxial to input axis of the first planetary gear set. Alignment of the electric motor with the wheel axle simplifies the design and enhances mechanical efficiency by reducing alignment issues.

Similarly, preferably, the input shaft and output shaft are parallel to the wheel axle, further simplifying the drivetrain layout and improves power transfer efficiency by minimizing gearing transmission power loss. Further compactification can be achieved by having the second pinion, that directs output torque to the differential wheel coaxial to the second carrier, in particular, aligning the second pinion with the second carrier. However, the second pinion may also be provided on an (additional) idler shaft or like transmission, when some space or further reduction is needed between the second planetary gear set and the differential wheel. Preferably the second pinion is directly coupled to the second carrier carrying the planetary wheels of the second planetary gear set. Such arrangement ensures a direct and efficient transfer of power, improving performance. Similarly, the first pinion is preferably coaxial to the first carrier, e.g. coupled to the first carrier.

The gear assembly in its most compact form comprises two parallel axles, one coupled to an electric motor and the other coupled to a differential wheel. Each axle is provided with a planetary gear set for reducing the rotational speed, one comprising an input shaft coupled to the electric motor and one comprising an output shaft coupled to the differential wheel. One or two of the planetary gear sets are shiftable, i.e. may produce multiple gear ratios.

While the gear assembly may be combined with other gearing and more than one electric motors, preferably the first sun wheel is coupled to the rotor to allow a compact design. In the gearing transmission, gear wheels may be spur wheels, but preferably have a helical toothing, which offers flexibility in design choices to optimize noise reduction, durability, and efficiency.

Preferably the second sun wheel is provided on a central shaft with the output shaft is coaxially rotatable relative to the central shaft. Such an arrangement aligns the second sun wheel and output shaft on a central axis which provides balanced and efficient rotation, reducing wear and improving longevity, and which allows for a clutch to lock the central axis relative to the stationary housing.

In this way, the second sun wheel is connected to the housing which prevents it from rotating when the clutch is grounded (connected to housing). With the sun gear locked, the second planetary acts as a reducing gearset where the input comes from the second ring wheel and output is taken from the second carrier. During the reduction operation, the planetary gear set increases output torque and reduces rotational speed.

Accordingly with a clutch locking the central axis and corresponding second sun wheel to the stationary housing will fixate the second sun wheel, which allows the second carrier to rotate with a reduction relative to the ring wheel. Similarly, a clutch may be provided to lock the central shaft relative to the output shaft, which bypasses the gearing and allows for a direct rotational control over power distribution, improving performance. In this state the second sun wheel is connected to the second carrier, locking the entire second planetary gear set with no relative motion between parts. Hence, there is no torque or speed change via the planetary gear set. As there is no relative motion between the parts of the planetary gear set, all sources of efficiency loss are eliminated, resulting in high efficiency mode.

A disconnect clutch may be provided that disconnects the second pinion from the output shaft. Such an arrangement allows for disengaging the second pinion from the output shaft, allowing for selective power delivery and improving vehicle efficiency. The disconnect clutch may be used to couple/decouple the output shaft from the rest of the drive-train, in particular, the differential wheel. The disconnect clutch may be integrated in a way that allows the entire gear assembly to be taken out of the power flow by actuating a single component. The disconnect clutch enables vehicle towing without the removal of axle half-shafts. Significant efficiency improvement opportunity is also realised by disconnecting particular motors when a vehicle is equipped with two or more motors in its drivetrain which may be selectively disconnected. By this arrangement, powershifting in dual motor configurations is supported, i.e. shifting without losing substantial power in the drive train during shift operation.

The axle drive can be two speed or four speed, and can be completely disconnected from the drive train by a disconnect clutch which can be integrated. In some embodiments, multiple gear ratios can be achieved by having two planetary gear sets (PGS) and two helical gear sets. In first gear, the two planetary gearsets may active (producing a certain gear ratio) and the helical gearsets are also active. In 2nd and 3rd gear either one planetary gearset is active and the other is locked (producing a ratio of 1:1) while the helical gear sets are still active. In 4th gear both planetaries are locked 1:1 and only the helical gear sets are active. By locking the planetaries 1:1, all relative motion (Gears, bearings, hydraulic shear) is removed, maximizing efficiency. In 4th gear only two gearsets have relative motion and a minimum number of bearings are active to achieve maximum efficiency.

Next, a shifting state is discussed wherein the first planetary gear set is shifted. To this end, a spline ring is provided with internal splines along an axial direction of the spline ring and is slidably provided over the first ring wheel having mating splines on its outer surface. The spline ring comprising an external groove along its circumference, for receiving a first shift actuator element to shift the spline ring in axial directions over the ring wheel; said spline ring further comprises a first interlock profile on one axial side, that locks the spline ring, when slid by the actuator element in one axial direction, to a corresponding profile provided onto the stationary housing. The spline ring also comprises a second interlock profile on an another axial side, that locks the spline ring, when slid by the actuator element in another axial direction, to a corresponding profile provided on the carrier.

While in principle a single shiftable planetary gear set may be provided with the inventive spline ring arrangement, preferably, both first and second planetary gear sets are shiftable to maximize efficiency. Also mutually different final drive ratios between the motors in dual motor configurations can be supported to tune an efficiency sweet spot. For example, a first motor may have a drive ratio in four shifts, different from a second motor, which allows for seamless coupling and shifting using both gear assemblies.

Turning now to the FIGURES, FIG. 1 illustrates a first perspective view of an electric drive 100 coupled to a differential wheel 200 (in isolated view). Differential wheel 200 defines an axis III coaxial to the vehicle axle. In the shown embodiment, the electric axle drive 100 comprises at least one electric motor 50 and a gear assembly 10. The gear assembly 10 comprises a first planetary gear set 61 and a first pinion 62 driven by the planetary gear set 61; and a second planetary gear set 71 of which second ring wheel 712 is clearly visible. The second ring wheel 712 is driven by the first pinion 62.

Figure 2:
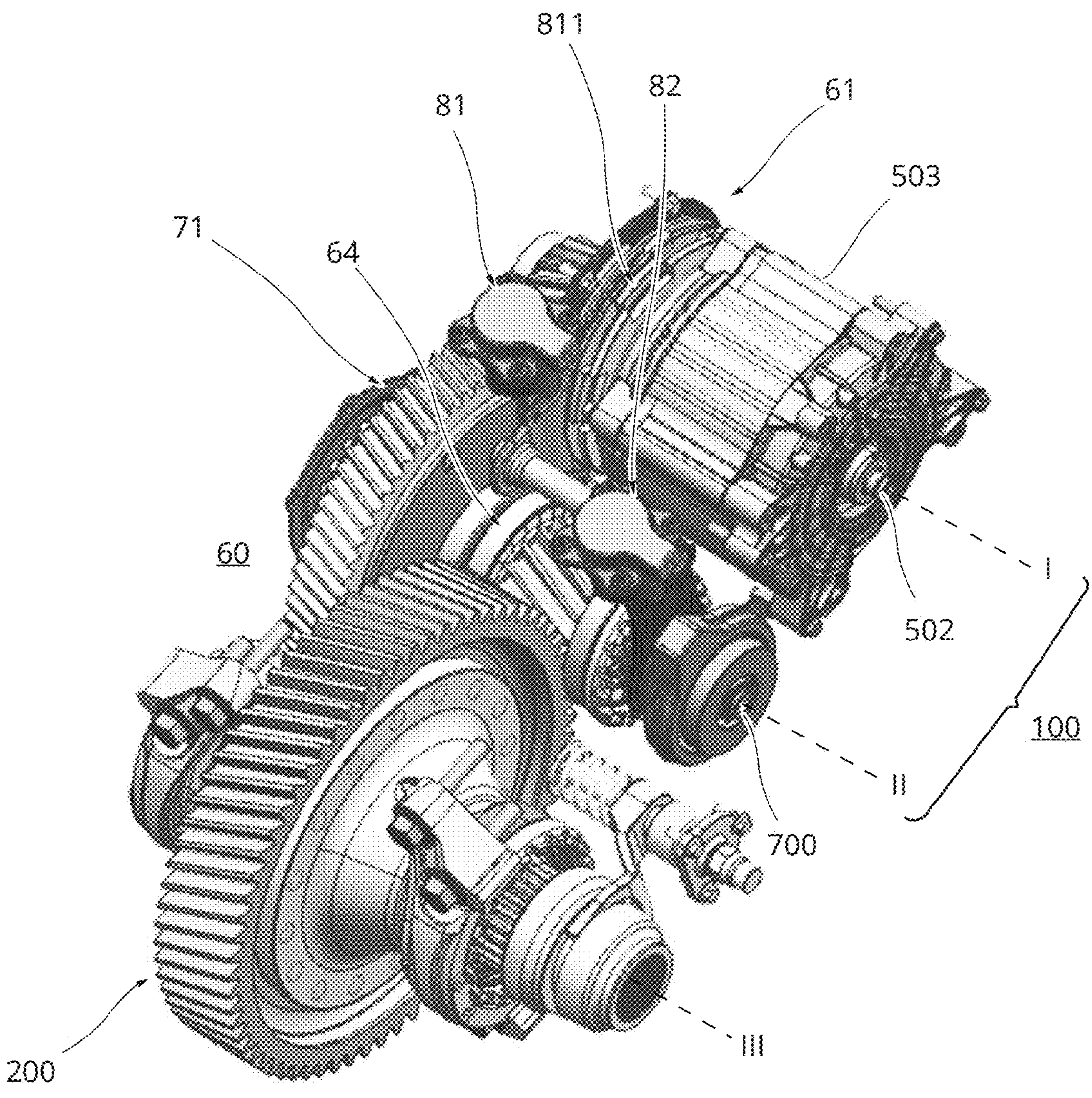
FIG. 2 illustrates the electric drive of FIG. 1 seen from another angle.

FIG. 2 illustrates the electric drive 100 of FIG. 1 seen from another angle, wherein a gear assembly input axle (not visible) is coupled to the rotor 502 and a gear assembly output axle is 700 coupled to the differential gear wheel via pinion 64. An actuator 81 is provided to shift the first planetary gear set 61 by sidewards movement of an actuator element 811 (Sec FIG. 1) and a further actuator 82 is provided to shift the second planetary gear set 71 as will be further developed in conjunction with FIGS. 4 and 5.

Figure 3:
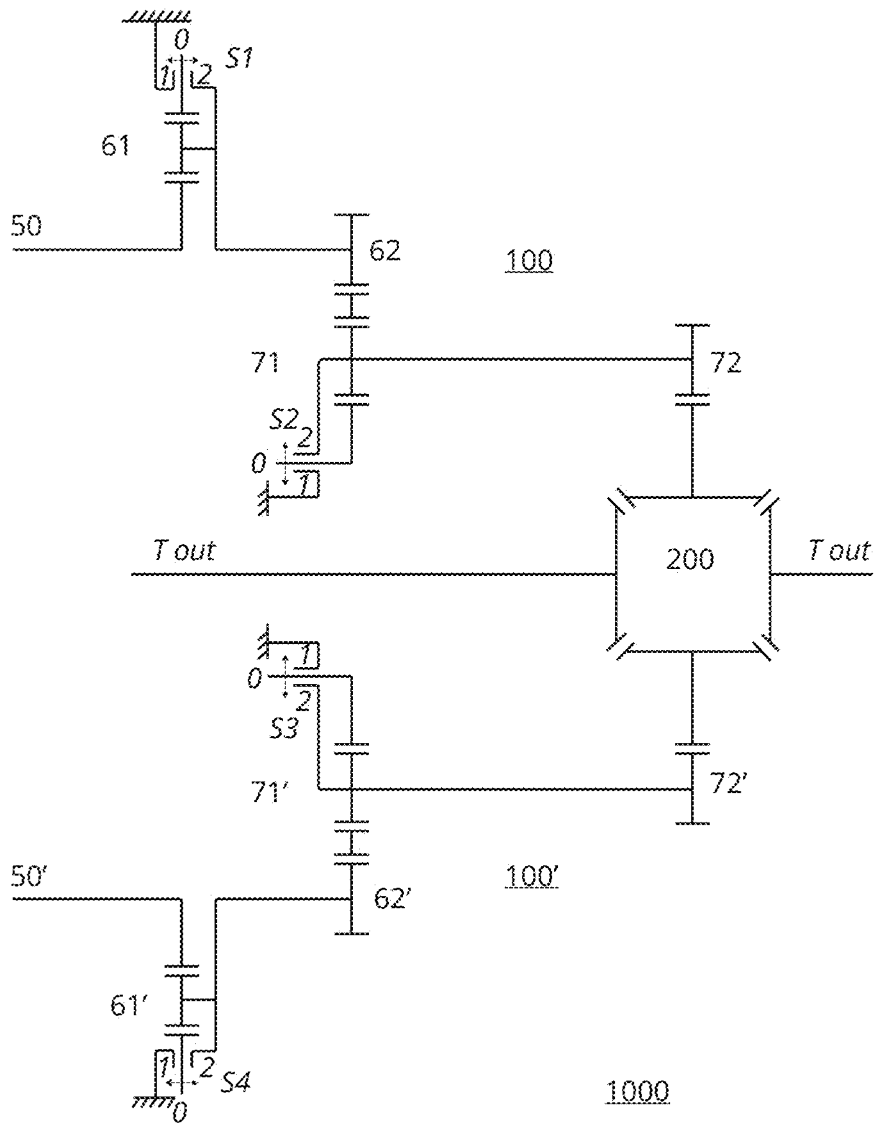
FIG. 3 illustrates a schematic diagram illustrating the power flow of the electric drive according to the embodiment.

FIG. 3 illustrates a schematic diagram illustrating the power flow of the electric drive according to the embodiment in a 'stick diagram' showing the power flow for a dual drive arrangement 1000 of two electric drives 100 and 100', each having an electric motor input 50, 50', respective planetary gear sets 61, 71 and 61', 71' and pinions 62, 72 and 62', 72' respectively. In the shown embodiment both planetary gear sets 61 and 71 are switchable, wherein in first planetary gear sets 61, 61' ring wheel is coupled to a fixed housing to fixate the ring wheel and provide a reduction ratio from the sun to the carrier, or coupled to the rotating carrier to eliminate the reduction ratio of the first planetary gear set. Similarly, in the second planetary gear set 71, 71' sun wheel is coupled to a fixed housing to fixate the sun wheel and provide a reduction ratio from the ring wheel to the carrier, or coupled to the rotating carrier to eliminate the reduction ratio of the second planetary gear set 71.

Figure 4:
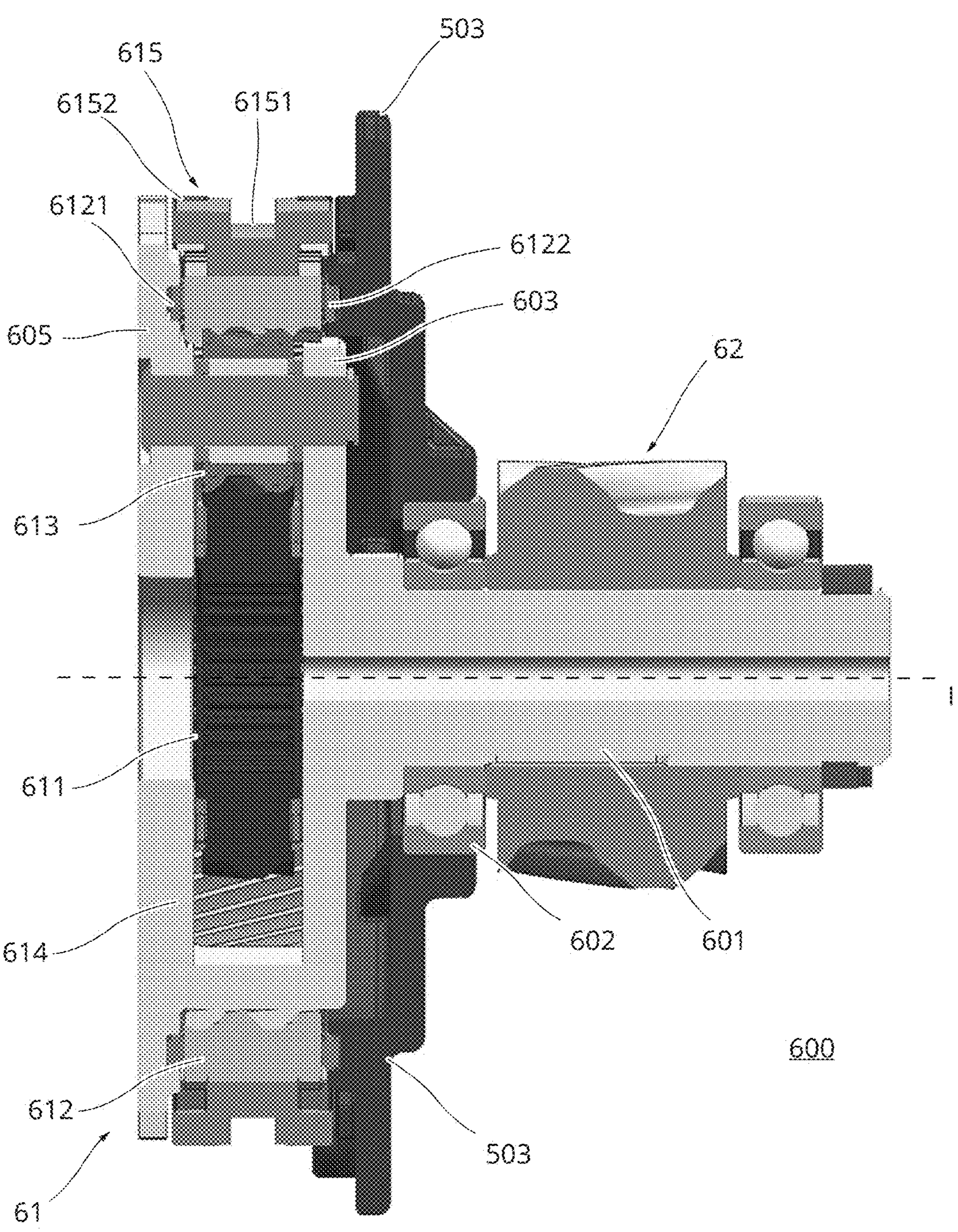
FIG. 4 illustrates a cross sectional view of the first planetary gear set across lines I-I in FIG. 1.

FIG. 4 illustrates a cross sectional view of a first input axle 600 that essentially is a rotatable carrier shaft 601 which rotates with planetary wheels 613 of planetary gear 61 and, of which one is depicted in cross section across lines I-I in FIG. 1. The carrier shaft 601 is coaxial to an input shaft (not depicted) coupled to sun wheel 611, which input shaft is powered by electric motor 50, in particular, driven by rotor 502 (FIG. 2).

As can be seen from the figure, first pinion 62 is coaxial to the first carrier 614 rigidly coupled to carrier shaft 601 that is rotatable in bearings 602 of a stationary housing 503. Other bearing geometries are feasible as long as first carrier 614 drives first pinion 62. In the following attention is given to the shift mechanism of the planetary gear set 61 that comprises a first sun wheel 611, a first carrier 614 of planetary wheels 613 and a first ring wheel 612.

To this end, spline ring 615 is provided with internal splines along an axial direction of the spline ring 615 and is slidably provided over the first ring wheel 612 having mating splines on its outer surface. The spline ring comprising an external groove 6151 along its circumference, for receiving shift actuator, in particular actuator element 811 (see FIG. 1) to shift the spline ring 615 in axial directions over the ring wheel 612. Spline ring 615 comprises an interlock profile 6152 on both sides, that locks the spline ring 615, when slid by the actuator element 811 to a corresponding profile provided onto the stationary housing 503. The spline ring 615 also comprises an interlock profile that locks the spline ring 615, when slid by the actuator element in the other axial direction, to a corresponding profile provided on the carrier 614.

This May Result in Following Gear States:

Gear State 1

The first ring wheel 612 comprises external splines mated to a shifting spline ring 615. When this spline ring 615 is shifted to one side, it may be fixed to the stationary housing 503 via a rigid mechanical coupling, e.g. a dog clutch profile, which constrains the rotational motion of the ring gear. Thus, in this gear state the first planetary gear set 61 acts as a reducing gearset where the input from the motor 50 is provided to the first sun gear 611 and the output is taken from the first carrier 614. During the reduction operation, the planetary gear set 61 increases output torque and reduces rotational speed.

Gear State 2

When the spline ring 615 is shifted to carrier flange 605 side, the first ring wheel 612 is fixed relative to the carrier 613 via a rigid mechanical connection. In this state the complete first planetary gear set 61 is locked, that is, sun 611, ring 612 and planet gears 613 do not rotate relative to each other inside the PGS, resulting in a ratio of 1 to 1. Hence, there is no torque or speed change via the PGS. As there is no relative motion between the parts of the PGS, all sources of efficiency loss are eliminated, resulting in high efficiency mode.

Carrier shaft 601 additionally comprises an internal flange 603. As one exemplary embodiment, ring wheel 612 can be inserted by sliding it over the internal flange 603 of the carrier shaft 601, which has a diameter smaller than the inner ring wheel 612. Housing 503 provides a side bearing 6122 of the ring wheel 612, that is, a bearing 6122 is provided between housing 503 and ring wheel 612 on one hand, and by bearing 6121 between external flange 605 of carrier shaft 601. In this way the ring wheel is robustly fixated axially between one stationary flange (housing 503) and one rotary flange (carrier flange 603), and needs no additional room to shift sidewards.

Accordingly, the primary axle I (see FIG. 2) of the first input shaft 600 comprises a first carrier shaft 601 that comprises a first flange 605 and a second flange 603, the second flange 603 having a diameter smaller than an inner diameter of the first ring wheel 612, and the first flange 605 having a diameter larger than the first ring wheel 612. The first flange comprises a first side bearing 6121 that bears the first ring wheel 612 on one side and also an interlock profile 6152 for locking the spline ring 615 to the carrier614. The stationary housing comprises a second flange part 503 comprising a second side bearing 6122 that additionally bears the first ring wheel 612 on its side and further comprises interlock profile for locking the spline ring 615 to the housing.

Figure 5:
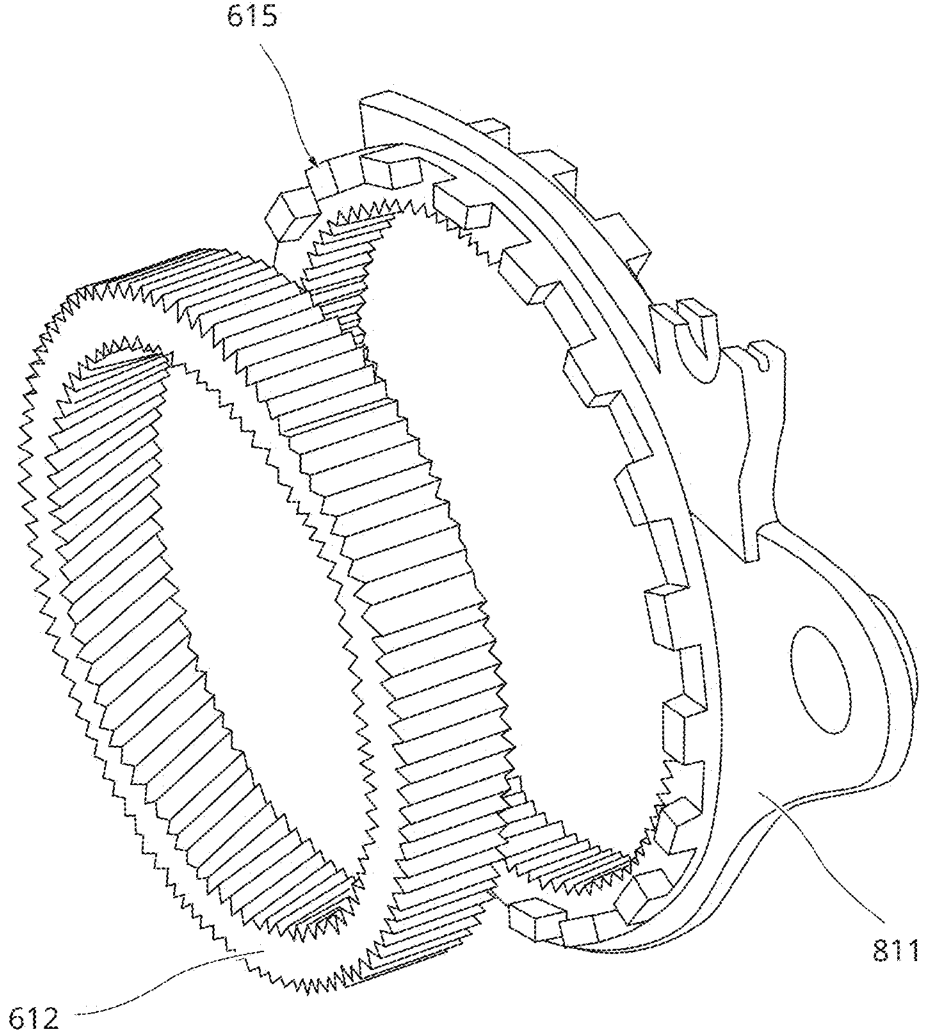
FIG. 5 shows a ring wheel in perspective exploded view.

FIG. 5 shows ring wheel 612 in perspective exploded view, together with spline ring 615 and actuator fork 811. Splines extend in axial direction over the outer circumference of the ring wheel 612, to cooperate with a mating internal circumference of spline ring 615.

Figure 6A:
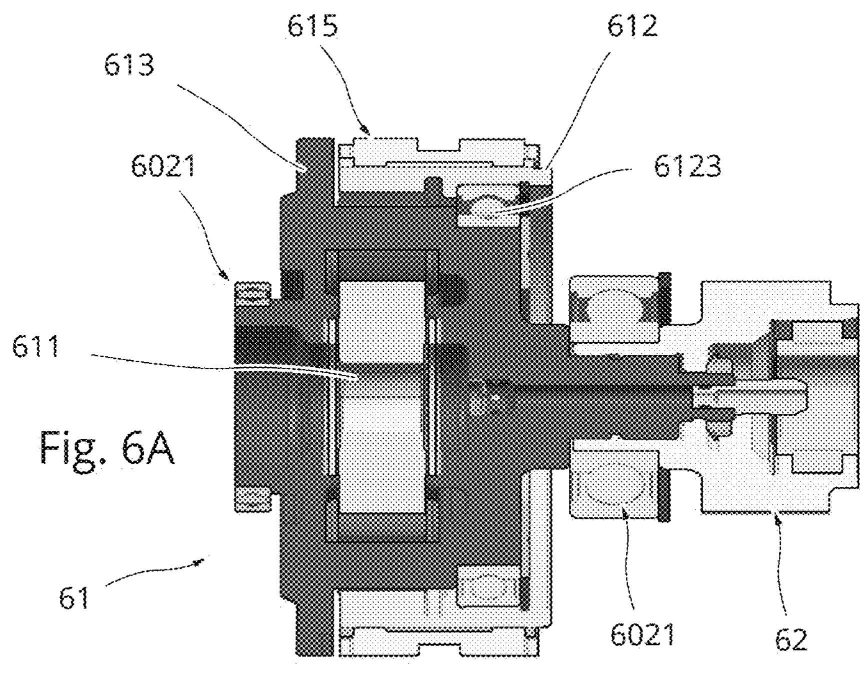
FIGS. 6A and 6B show other exemplary bearing arrangements.
Figure 6B:
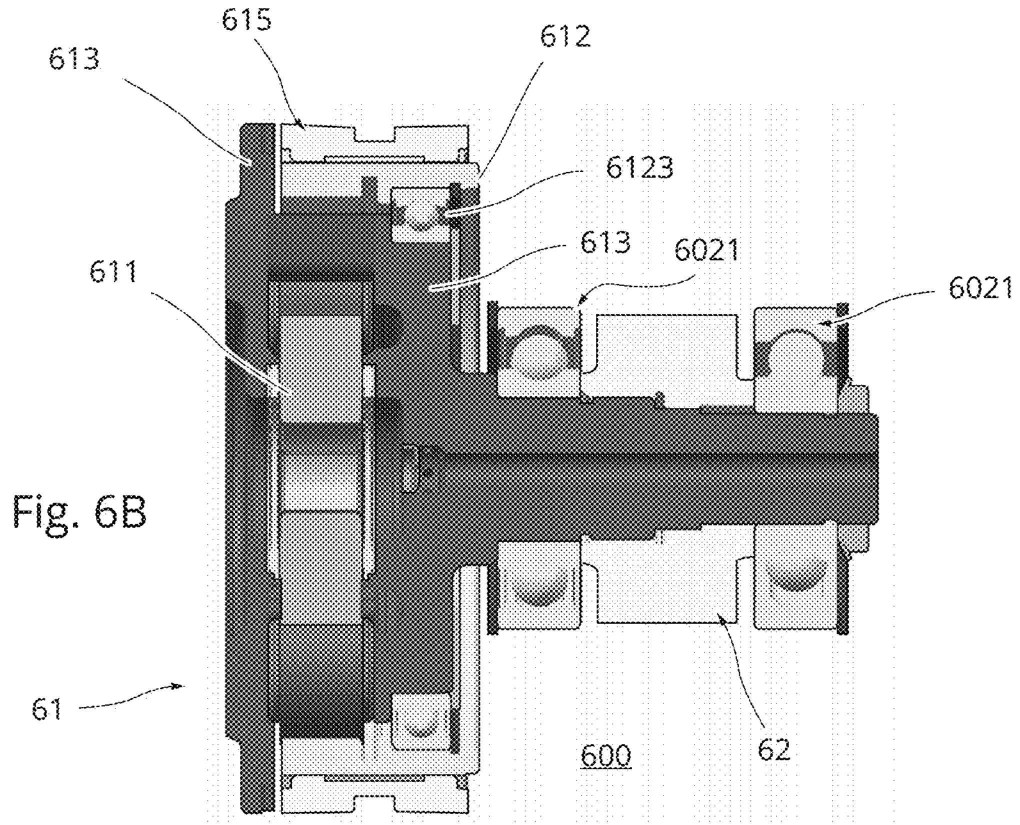

Other exemplary bearing arrangements of the first planetary gear 61 are shown in FIGS. 6A and 6B, where, instead of a side bearing as shown in FIG. 4, ring wheel 612 is mounted by roller bearings 6123 are provided between bear ring wheel 612 to the carrier 613 on the primary shaft 600. The primary shaft may be provided with bearings 6021 which may be of a suitable type. Similar to the spline ring 615 illustrated in FIG. 4, spline ring can be shifted to one side to connect to carrier 613 or to an opposite side to connect to a housing part (not shown).

The stationary housing 503 may be part of electric motor 50 but may also be part of other stationary features of the drive 100.

Figure 7:
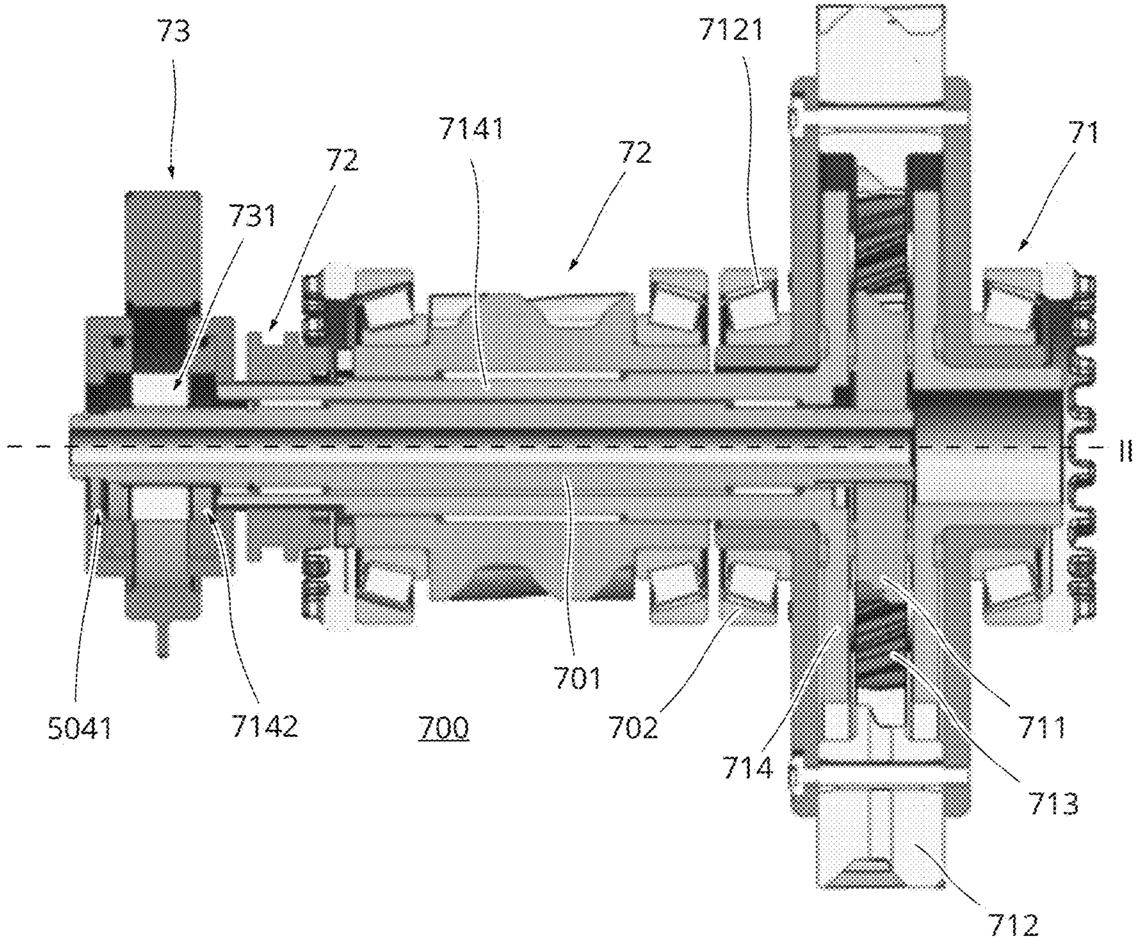
FIG. 7 illustrates a cross sectional view of the second planetary gear set across lines II-II in FIG. 2.

FIG. 7 illustrates a cross sectional view of an output shaft 700 of a secondary axle II (see FIG. 2), including the second planetary gear set 71 across lines II-II in FIG. 2. Analogous to the first planetary gear set 61 depicted in FIG. 4, the second planetary gear set 71 comprises a second sun wheel 711 (sun gear), a second carrier 714 of planetary wheels 713, and a second ring wheel 712. The secondary axle further comprises a central shaft 701, or sun shaft, coaxial to the second carrier shaft 714 that mounts the sun gear 611 of the second planetary gear set. Sun gear 711 may be connected via sun shaft 701 by a 3 position clutch 73 to a housing part 5041 which prevents the sun gear 711 from rotating when the clutch is grounded. The clutch 73 may be embodied in several forms, one of which is depicted in the FIGURE.

When the sun gear 711 is fixed to the housing 504, the PGS is caused to act as a reducing gearset where the input comes from the ring wheel 712 and output is taken from the carrier 714. In an alternative clutch state sun gear 711 is connected by clutch element 731 to the carrier part 7142 rigidly connected to carrier shaft 7141. In this state the entire PGS is locked and there is no relative motion between parts, in particular, ring wheel 712 and carrier shaft 714. Hence, there is no torque or speed change via the PGS. As there is no relative motion between the parts of the PGS, all sources of efficiency loss are eliminated, resulting in high efficiency mode. In an unlocked state shift element 731, rotating with sun shaft 701, may rotate freely relative to the housing part 5041 or carrier shaft part 7142 which may be used when synchronizing the relative speed between sun shaft 701 and carrier shaft 7141. Shift element 731 may be acted by a solenoid or suitable actuator part.

Ring wheel 712 is carried by bearings 7121 and is rotatable relative to carrier shaft 7141.

Figure 8A:
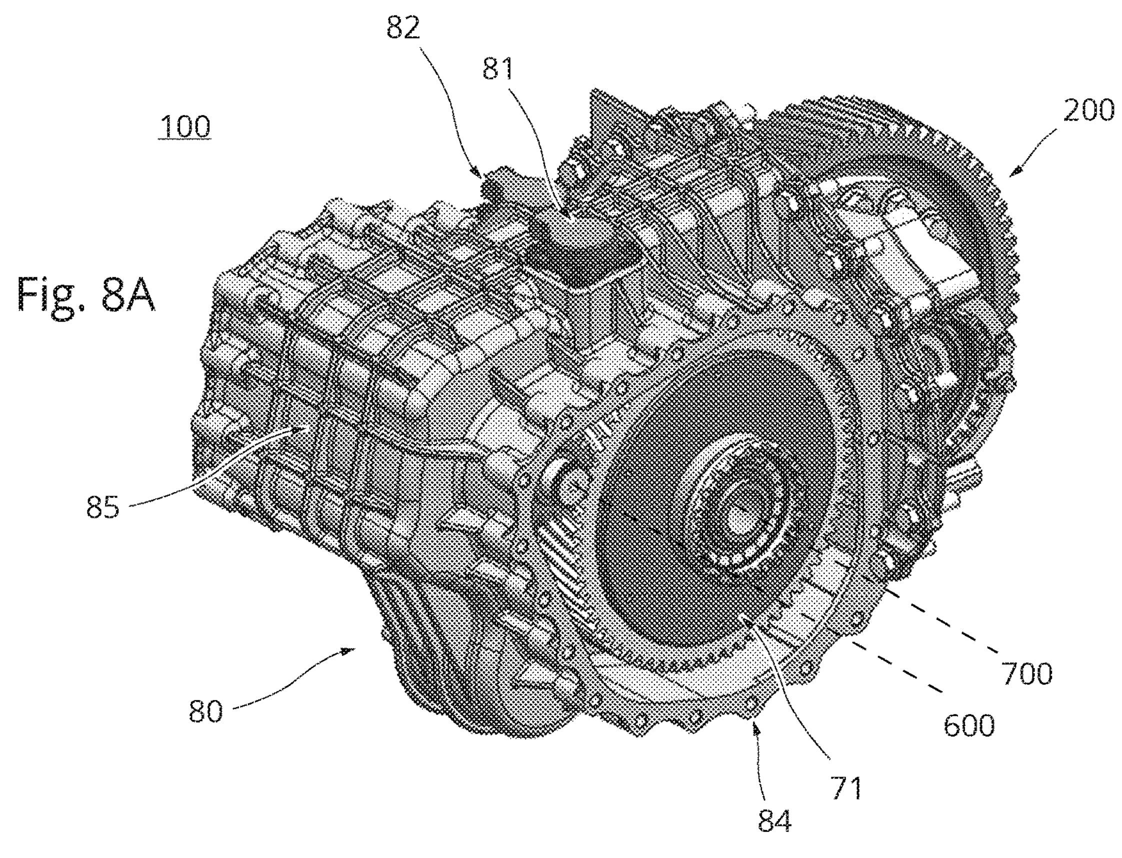
FIG. 8A shows a first perspective view of an electric drive when mounted in a drive housing.

FIG. 8A shows a first perspective view of an electric drive when mounted in a drive housing, of which central part 80 is visible and which houses motor part 85 and gear assembly. Drive housing 80 has actuator inputs 81 and 82 and connects via flange 81 to a central wheel axle housing not shown. Gear assembly, in particular output axle 700 can be inserted via the opening 84 covered by a flange cap (not shown). Input axle 600 can be inserted from the other side, as can be shown in FIG. 8B.

The housing 80 may be used to support all the internals of the E-axle including gears, bearings, differential, actuators, oil pumps and other ancillaries. The housing 80 may also provide for storage for cooling and lubricating fluids as well as a protection for the internal components from external environmental factors. There may be various cooling and lubrication channels integral to the housing or they can be mounted as separate lines or externally. As such, there are multiple design approaches being considered to for the housing based on the assembly requirements, manufacturing methods and technical feasibility.

Figure 8B:
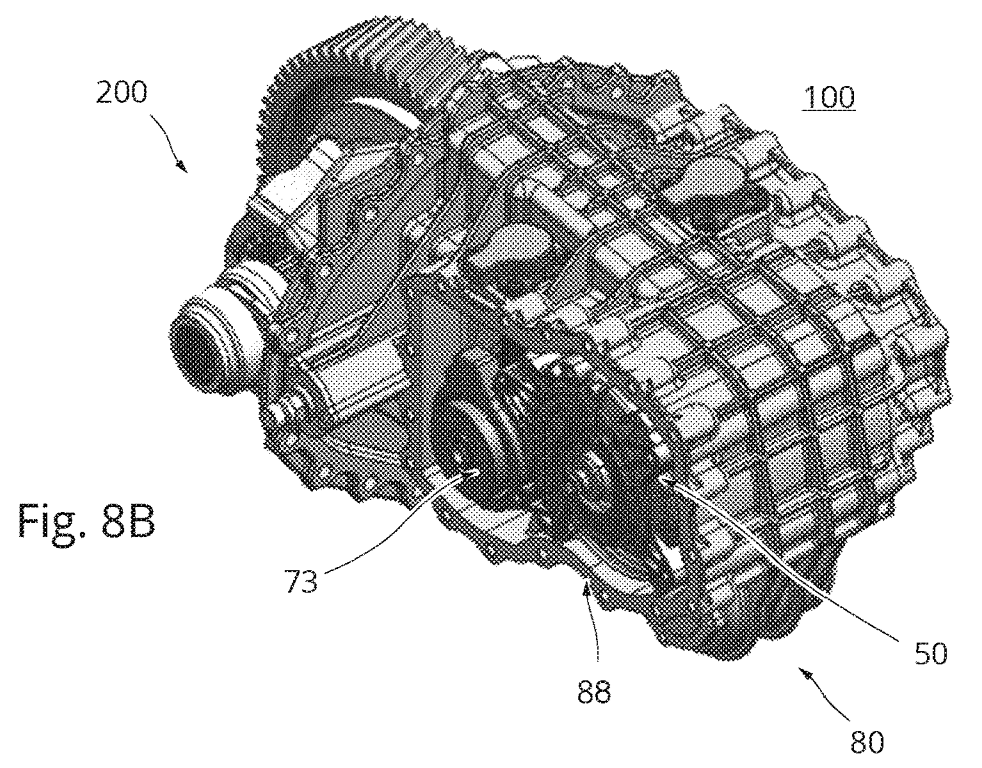
FIG. 8B shows a second perspective view of the electric drive when mounted in a drive housing.

FIG. 8B shows a second perspective view of the electric drive 100 when mounted in drive housing 80 which shows e-motor 50 which can be inserted and fixated with a mount cap (not shown) to be mounted to a side flange 88.

Figure 9A:
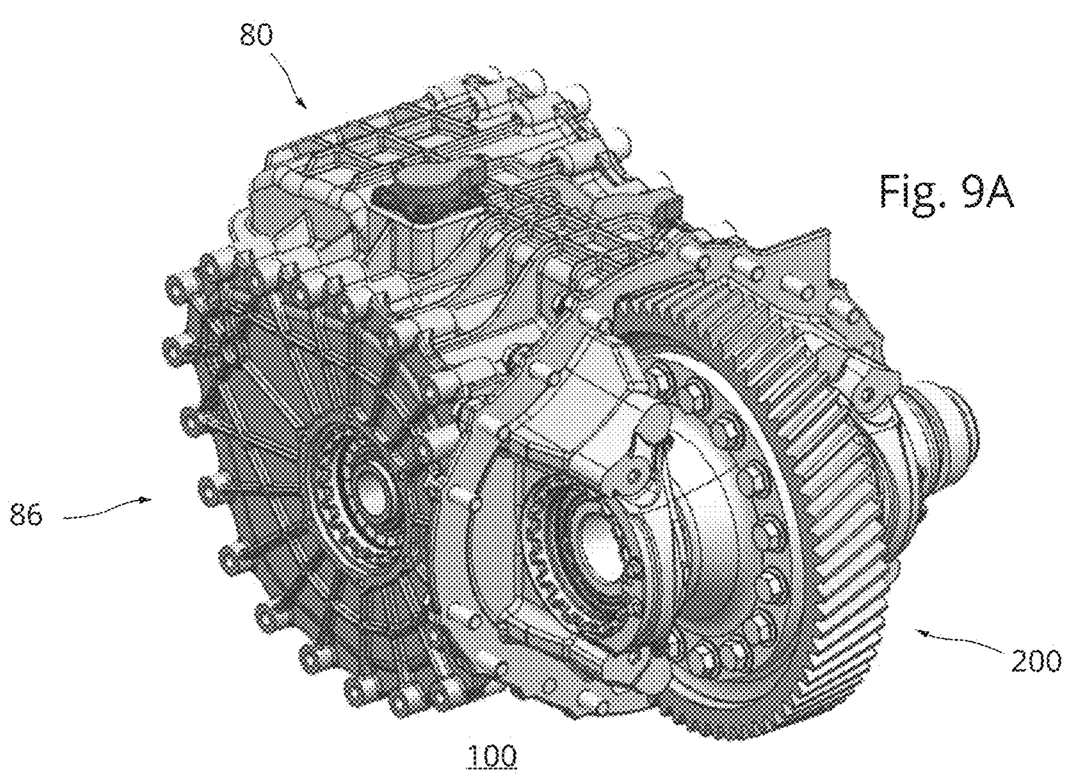
FIG. 9A shows the housing in a further perspective view with a mounting cap installed.

FIG. 9A shows the housing in a further perspective view with a mounting cap or cover 86 installed. The centre housing 80 may be the main support for the gear assembly 10, e-motor 50 and differential 200. It houses bearing devices to support the differential and possible preload adjustment mechanism for its bearings. The centre housing 80 may also comprise an integrated wall to provide support to the carrier shaft bearings 601 and 702 and the shift actuator 81 and fork elements. It may also support oil pump(s) and other ancillaries. The main volume of the cooling and/or lubricating fluid can be stored in the centre housing 80 and sealed using covers 86 and 87 (see FIG. 9B).

Figure 9B:
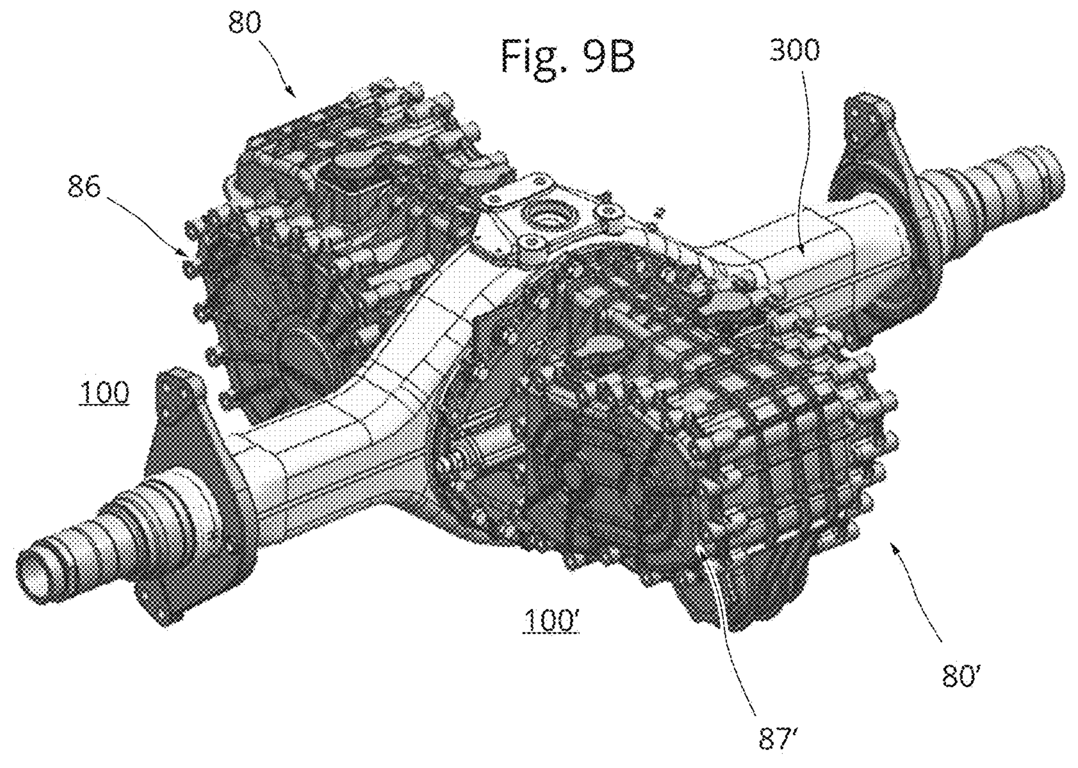
FIG. 9B shows a dual drive embodiment showing two electric drives mounted opposite to a differential wheel.

FIG. 9B shows a dual drive embodiment showing two electric drives 100, 100' mounted opposite to a wheel axle body 300. The centre housings 80, 80' may be the only housing elements that are connected to the wheel axle body 300 as covers 86 and 87 (87' in the Figure) are directly mounted to the centre housing 80. The housing concept includes an assembly of at least three parts 80, 86 and 87 connected to a wheel axle body 300. There may be one or more covers used to seal off the axle body where access is required during assembly. An axle 300 can have one or two housing assemblies, one on each side of the axle body depending on the application.

Cover 86 may hold a bearing to support the output axle 700, a bearing pre-loading nut and dowel pins for accurate positioning within the centre housing 80. It also supports a bearing for the input axle 600. The flange 84 of this cover may form a leak proof seal when assembled onto the centre housing. This cover may also be provided with one or more additional openings for reasons of assembly process or verification. These openings are then sealed with separate covers.

Cover 86 connects to housing 80. It covers the e-motor 50 and provides support to the electronic clutch 81 on the output axle 700. This cover may also be provided with one or more additional openings for reasons of assembly process or verification. These openings may be sealed with separate covers.

Further Embodiments and Advantages.

Figure 10:
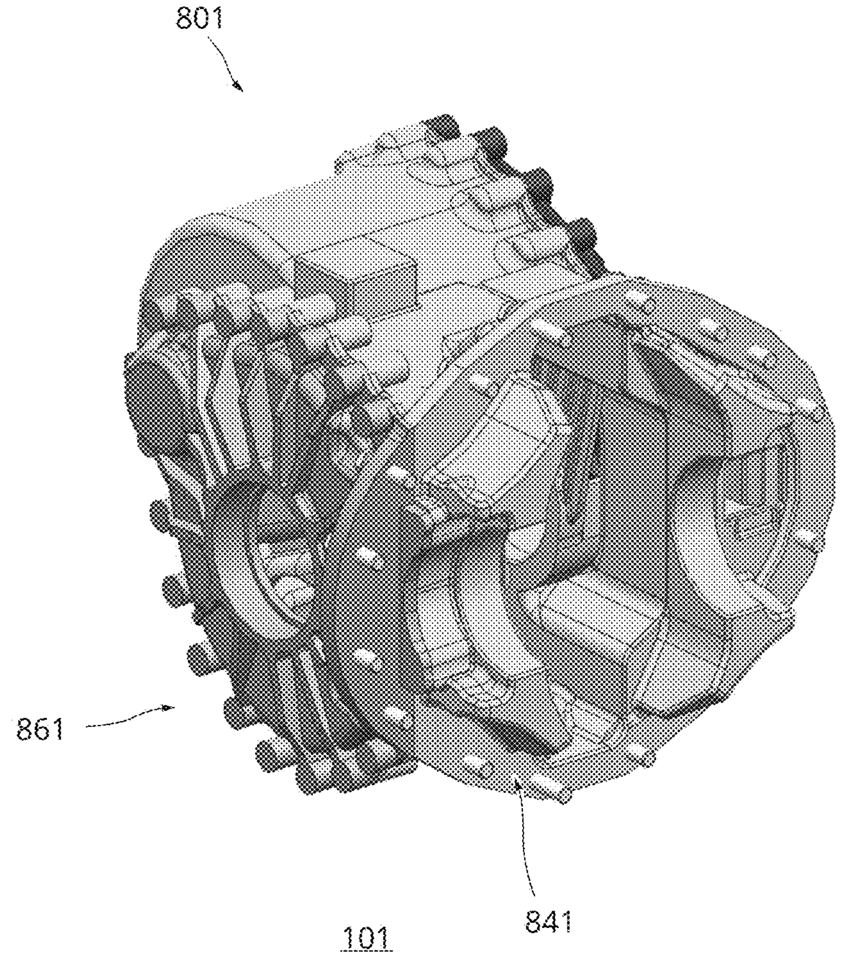
FIG. 10 shows a variation on the housing concept.

FIG. 10 shows a variation on the concepts illustrated in the preceding, where the supporting caps are partly supported on the wheel axle body. In particular, side cap 861 of housing may be mounted partly on wheel axle body with a flange part that extends from a flange part 841 of the centre housing 801, that connects to the wheel axle body.

Accordingly, compared to the embodiment shown in FIG. 8 and FIG. 9 having main flange 84 to mount drive unit 100 to the axle body 300 is split into centre housing 801 and mounting cap 861. The split may be perpendicular but can have different forms, e.g. a slant split e.g. angled relative to the wheel axle, which can further shorten the axial extension of the electric drive 101 and aids in the assembly of the output axle into the housing as slanted cap 861 results into a larger opening. The concept also provides more freedom to position the bolts on the main flange by virtue of design.

The axle drive illustrated allows for scalability and modularity by creating a gearbox design to base the rest of the architecture around. This gearbox can be assembled to a traditional axle body on the front, back, or both sides (non-traditional installation can also be achieved if desired). Such design allows for (non exhaustive) configurations as a single electric motor axle drive; a dual electric motor axle drive; a vehicle with tandem wheel axles having a single electric motor axle drive unit per axle; a vehicle with tandem wheel axles with dual units on one or both the axles; tridem axles with single or dual units per axle; front driven axles with single or dual drive units for all wheel drive or using the above base configurations having more than one powered wheel axle.

Traditional axle drive designs are generally limited to 2-3 speeds and have either a launchability limitation or are not efficient at high speeds due to the motor operating near its speed limit. By adding a 4th speed, this eAxle improves launchability while maintaining a high efficiency at high speeds. 4 speeds eAxles do exist but the method that we achieve the 4 speeds with is novel. Conventional transmission design would be a layshaft or single planetary and layshaft design, which will have more components spinning thus increasing energy consumption.

If an axle drive is disconnected only one actuator is needed, reducing costs and points of failure. This invention also supports disconnecting just one motor in dual motor configurations, if the disconnect is after the differential the entire powertrain is disconnected, not just one motor. The axle drive may achieve similar functionality by placing the clutch in a neutral position.

The invention claimed is:

1. An electric axle drive for a vehicle wheel axle with a differential gear wheel coaxial to the wheel axle; said axle drive comprising:

at least one electric motor and a gear assembly, said electric motor comprising a rotor and a stationary housing; and the gear assembly comprising a gear assembly input shaft coupled to the rotor and a gear assembly output shaft to be rotatably coupled to the differential gear wheel;

wherein the gear assembly comprises:

a first planetary gear set driven by the gear assembly input shaft:

a first pinion driven by the first planetary gear set;

a second planetary gear set driven by the first pinion; and wherein said gear assembly output shaft is driven by the second planetary gear set;

said first planetary gear set further comprising a spline ring that is provided with internal splines along an axial direction of the spline ring and that is slidably provided over a first ring wheel of the first planetary gear set having mating splines on its outer surface;

said spline ring further comprising an external groove along its circumference, for receiving a first shift actuator element to shift the spline ring in axial directions over the first ring wheel;

said spline ring further comprises a first interlock profile on one axial side, that locks the spline ring, when slid by the actuator element in one axial direction, to a corresponding interlock profile provided onto the stationary housing; and wherein said spline ring comprises a second interlock profile on another axial side, that locks the spline ring, when slid by the actuator element in another axial direction, to a corresponding interlock profile provided on a first carrier shaft of the first planetary gear set, wherein a second pinion is mounted on a secondary axle of the output shaft coaxial to a second carrier shaft;

wherein the secondary axle comprises a central shaft coaxial to the second carrier shaft that mounts a second sun wheel of the second planetary gear set, and wherein a clutch is provided to lock the second sun wheel relative to the stationary housing.

2. The electric axle drive according to claim 1, wherein the gear assembly output shaft is rotatably coupled to said differential gear wheel by the second pinion.

3. The electric axle drive according to claim 1, wherein the rotor is parallel to the wheel axle.

4. The electric axle drive according to claim 1, wherein the input shaft and output shaft are parallel to the wheel axle.

5. The electric axle drive according to claim 1, wherein the first pinion is coaxial to the first planetary gear set.

6. The electric axle drive according to claim 1, wherein the first pinion is coupled to the first carrier shaft of the first planetary gear set.

7. The electric axle drive according to claim 1, wherein the first planetary gear set and first pinion are mounted on a primary axle of the input shaft.

8. The electric axle drive according to claim 7, wherein the primary axle comprises a first carrier shaft that comprises a first flange and a second flange that mounts planetary wheels of the first planetary gear set, the second flange having a diameter smaller than an inner diameter of the first ring wheel, and the first flange having a diameter larger than the first ring wheel.

9. The electric axle drive according to claim 8, wherein the first flange comprises a first side bearing that bears the first ring wheel; and wherein the first flange further comprises the interlock profile for locking the spline ring to the first carrier shaft.

10. The electric axle drive according to claim 9, wherein the stationary housing comprises a second flange part comprising a second side bearing that bears the first ring wheel; and wherein the second flange part further comprises the interlock profile for locking the spline ring to the stationary housing.

11. The electric axle drive according to claim 1, wherein the second carrier shaft mounts planetary wheels of the second planetary gear set.

12. The electric axle drive according to claim 1, wherein a clutch is provided to lock the second sun wheel relative to the output shaft.

13. The electric axle drive according to claim 1, wherein a disconnect clutch is provided that disconnects the second pinion from the output shaft.

14. The electric axle drive according to claim 1, wherein a first sun wheel of the first planetary gear set is coupled to the rotor.

15. The electric axle drive according to claim 1, wherein gear wheels of at least one of the first planetary gear set and the second planetary gear set are coupled by a helical toothing or by a spur toothing.

* * * * *